United States Patent
Norieda

(10) Patent No.: US 8,730,159 B2
(45) Date of Patent: May 20, 2014

(54) INPUT DEVICE, TERMINAL EQUIPPED WITH THE SAME, AND INPUTTING METHOD

(75) Inventor: Shin Norieda, Tokyo (JP)

(73) Assignee: NEC Corporation, Tokyo (JP)

( * ) Notice: Subject to any disclaimer, the term of this patent is extended or adjusted under 35 U.S.C. 154(b) by 297 days.

(21) Appl. No.: 12/919,579

(22) PCT Filed: Feb. 23, 2009

(86) PCT No.: PCT/JP2009/053170
§ 371 (c)(1),
(2), (4) Date: Aug. 26, 2010

(87) PCT Pub. No.: WO2009/110340
PCT Pub. Date: Sep. 11, 2009

(65) Prior Publication Data
US 2010/0328211 A1    Dec. 30, 2010

(30) Foreign Application Priority Data

Mar. 3, 2008  (JP) ................................ 2008-051867
Jun. 26, 2008 (JP) ................................ 2008-166854

(51) Int. Cl.
G06F 3/033      (2013.01)
G09G 5/08       (2006.01)
G06F 3/041      (2006.01)

(52) U.S. Cl.
USPC ........................................ 345/157; 345/173

(58) Field of Classification Search
USPC ................................................ 345/157, 173
See application file for complete search history.

(56) References Cited

U.S. PATENT DOCUMENTS

| | | | |
|---|---|---|---|
| 2004/0012559 A1 | 1/2004 | Seki et al. | |
| 2005/0244166 A1* | 11/2005 | Shinagawa et al. | 398/186 |
| 2008/0316183 A1* | 12/2008 | Westerman et al. | 345/173 |
| 2009/0213081 A1* | 8/2009 | Case, Jr. | 345/173 |
| 2010/0265172 A1* | 10/2010 | Sadahiro | 345/157 |

FOREIGN PATENT DOCUMENTS

| | | |
|---|---|---|
| JP | 2004-054390 | 2/2004 |
| JP | 2004-199145 | 7/2004 |
| JP | 2004-537802 | 12/2004 |
| JP | 2005-301874 | 10/2005 |
| JP | 2006-302204 | 11/2006 |
| WO | 2008/023546 | 2/2008 |
| WO | WO 2008023546 A1 * | 2/2008 |

OTHER PUBLICATIONS

International Search Report—PCT/JP2009/053170—Apr. 7, 2009.

* cited by examiner

*Primary Examiner* — Kent Chang
*Assistant Examiner* — Nathan Brittingham
(74) *Attorney, Agent, or Firm* — Young & Thompson

(57) ABSTRACT

An input device includes an input section having a detection section which detects a force transmitted via a human body when a trailing operation is performed on a part of the body contacting the input device, and outputs the force as detection data "a"; a timer management control unit which generates a timing for converting the detection data "a" into time-series data and outputs the timing as timing data "c"; an input information specifying unit which converts the detection data "a" into time-series data based on the timing data "c", compares the time-series data with stored data "b" in a database which has been set beforehand, to thereby specify an input operation and output the input operation as input information specifying data "d"; and an information presenting unit which, upon receiving the input information specifying data "d", displays a function assigned to the input operation.

20 Claims, 20 Drawing Sheets

FIG.7

| | i) FIRST INPUT AREA | ii) SECOND INPUT AREA | iii) THIRD INPUT AREA |
|---|---|---|---|
| |  |  | 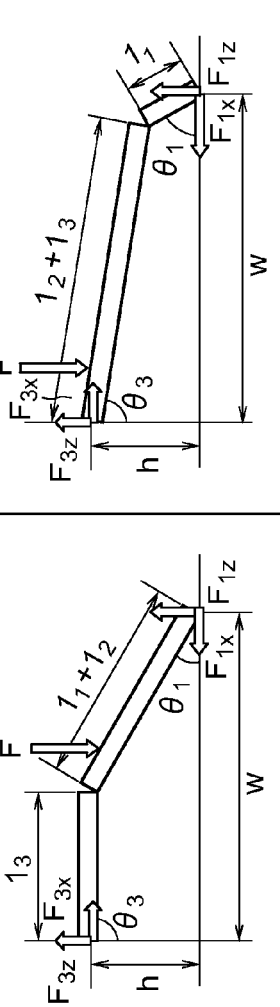 |
| | $w = l_3 \sin\theta_3 + (l_1+l_2)\cos\theta_1$ $h = l_3 \cos\theta_3 + (l_1+l_2)\sin\theta_1$ $F_{1z} + F_{3z} = F$ $F_{3x} = F_{1x}$ $\frac{1}{2} l_1 F \cos\theta_1 = wF_{3z} + hF_{3x}$ $\left[ l_3 \sin\theta_3 + \left\{ \frac{1}{2} l_1 + l_2 \right\} \cos\theta_1 \right] F = wF_{1z} - hF_{1x}$ | $w = l_3 \sin\theta_3 + (l_1+l_2)\cos\theta_1$ $h = l_3 \cos\theta_3 + (l_1+l_2)\sin\theta_1$ $F_{1z} + F_{3z} = F$ $F_{3x} = F_{1x}$ $\left\{ l_1 + \frac{1}{2} l_2 \right\} F \cos\theta_1 = wF_{3z} + hF_{3x}$ $\left[ l_3 F \sin\theta_3 + \frac{1}{2} l_2 \cos\theta_1 \right] = wF_{1z} - hF_{1x}$ | $w = (l_2+l_3)\sin\theta_3 + l_1 \cos\theta_1$ $h = (l_2+l_3)\cos\theta_3 + l_1 \cos\theta_1$ $F_{1z} + F_{3z} = F$ $F_{3x} = F_{1x}$ $\frac{1}{2} l_3 F \sin\theta_3 = wF_{3z} + hF_{3x}$ $\left[ l_1 \cos\theta_1 + \frac{1}{2} l_3 + l_2 \cos\theta_3 \right] F = wF_{3z} + hF_{3x}$ |

FIG.9

| INPUT OPERATION | TIME-SERIES DATA | | |
|---|---|---|---|
| i) TRACING OPERATION IN LEFT DIRECTION  | PRESSING DIRECTION<br>FINGERTIP SLIDING DIRECTION<br>FINGER SIDE FACE VERTICAL SLIDING DIRECTION | 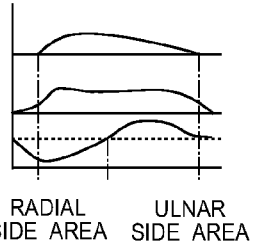 | RADIAL SIDE AREA    ULNAR SIDE AREA |
| ii) TRACING OPERATION IN RIGHT DIRECTION 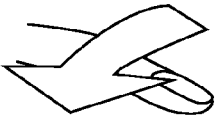 | PRESSING DIRECTION<br>FINGERTIP SLIDING DIRECTION<br>FINGER SIDE FACE VERTICAL SLIDING DIRECTION | 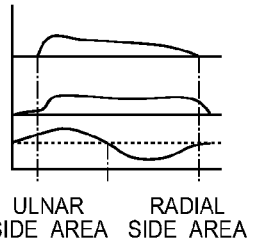 | ULNAR SIDE AREA    RADIAL SIDE AREA |
| iii) TRACING OPERATION IN FINGERTIP DIRECTION  | PRESSING DIRECTION<br>FINGERTIP SLIDING DIRECTION<br>FINGER SIDE FACE VERTICAL SLIDING DIRECTION | 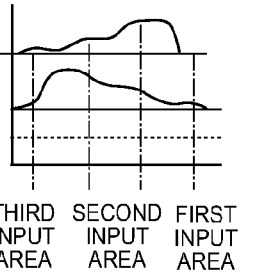 | THIRD INPUT AREA   SECOND INPUT AREA   FIRST INPUT AREA |
| iv) TRACING OPERATION IN FINGER BASE DIRECTION 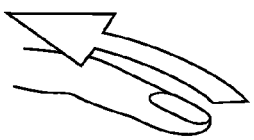 | PRESSING DIRECTION<br>FINGERTIP SLIDING DIRECTION<br>FINGER SIDE FACE VERTICAL SLIDING DIRECTION | 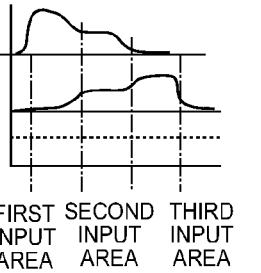 | FIRST INPUT AREA   SECOND INPUT AREA   THIRD INPUT AREA |

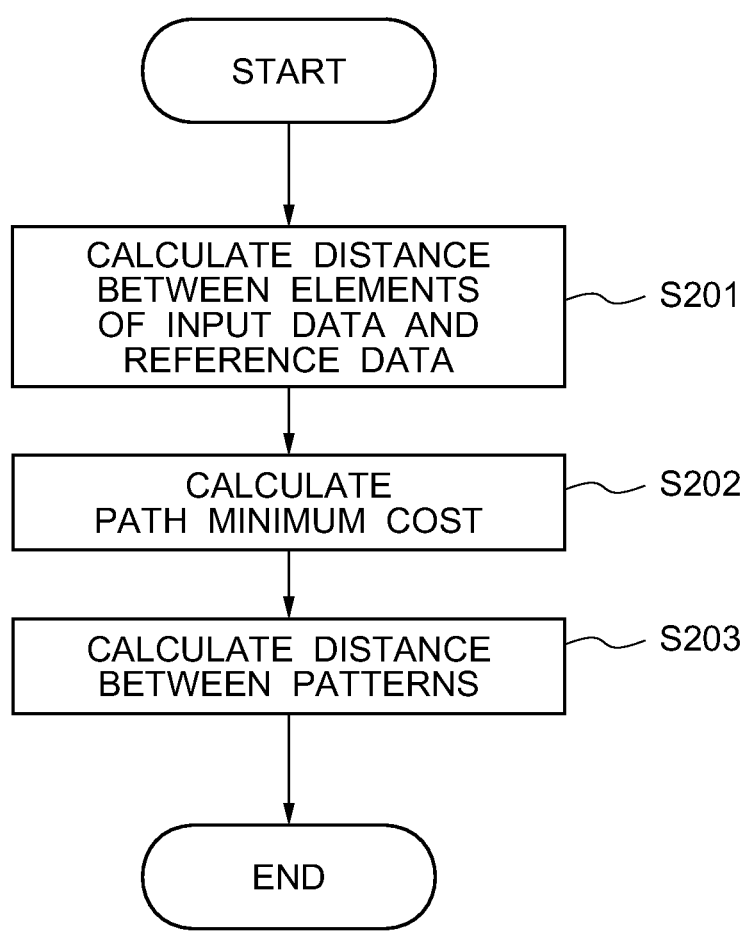

INPUT DEVICE, TERMINAL EQUIPPED WITH THE SAME, AND INPUTTING METHOD

TECHNICAL FIELD

The present invention relates to an input device and an inputting method, applicable to mobile devices such as mobile phones, PDAs, and laptop PCs.

BACKGROUND ART

As input devices used in mobile devices focused on portability or on display units, those having a smaller input section on the device are required.

One method for reducing the space of an input section on a device is to detect finger pressures in X, Y, and Z directions to thereby perform pointing or text inputting operation. In an example of this method, track points are used, and handwriting text inputting is performed according to the finger pressure varying pattern thereof (see Patent Document 1, for example). However, in the invention of Patent Document 1, as a finger performing inputting operation does not move, it is difficult to check the operation, so that a user has to get used to inputting. This may cause input errors.

In another method, a detection unit is separated from a device and is independently disposed. As an example of this method, a device has been known in which a detection unit is attached to a human body and inputting is performed (see Patent Document 2, for example). However, as an input section has to be prepared separately from the device, this method does not have a high level of portability, and involves botheration of attaching a detection section to the operator.

Patent Document 1: Japanese Unexamined Patent Publication 2005-301874

Patent Document 2: Japanese Unexamined Patent Publication 2004-537802

DISCLOSURE OF THE INVENTION

Problems to be Solved by the Invention

If the input section (input area) of an input device for an electronic device, such as an information terminal, is reduced, it is difficult to perform detail inputting operations such as positioning and speed control for pointing operation, because inputting in a small input area requires operation of complicated operating system for control and delicate manipulation of the device.

As such, a large input area is required for operation such as handwriting text inputting, because in input operation such as handwriting text input, scrolling and designation of an input start position at an absolute position are necessary. Accordingly, it has been difficult to realize both scrolling and handwriting text inputting operation and reduction of the input area in the conventional input device.

On the other hand, as disclosed in Patent Document 2, in the method of separating the input section from the device and attaching to a human body, a demand for reducing an input area on the device can be satisfied.

However, this method involves botheration of attaching the input section to the operator, and the input section is an obstacle when not being used.

An object of the present invention is to provide an input device for a mobile device focused on portability or on a display unit, capable of solving inconvenience to an operator caused by reduction of an area of an input section on the device.

Means for Solving the Problem

In order to achieve the object, the present invention is an input device, in which a detection section is contacted by a portion of an object, and when a trailing operation (an operation of sliding a portion other than the contact portion of the object in the vicinity of the contact portion of the object) is performed in the vicinity of the contact portion of the object, the trailing operation is specified and a display corresponding to the trailing operation is presented. The input device includes a detection section which is contacted by a portion of the object, and when trailing is performed in the vicinity of a contact portion of the object, detects a force transmitted via the object and outputs the force as detection data; a timer management control unit which generates timings for recording the detection data at time intervals, and outputs the timings as timing data; and an input information specifying unit which creates time-series data of the detection data based on the detection data and the timing data, compares the time-series data with stored data in a database which has been set beforehand, specifies an input operation, and outputs the input operation as input information specifying data.

Further, in order to achieve the object, the present invention is an inputting method, in which a detection section is contacted by a portion of an object, and when a trailing operation is performed in the vicinity of the contact portion of the object, the trailing operation is specified and a display corresponding to the trailing operation is presented. The method includes a detection step for, when a portion of an object is contacted and trailing is performed in the vicinity of the contact portion of the object, detecting a force transmitted via the object and outputting the force as detection data; a timer management controlling step for generating timings for recording the detection data at time intervals, and outputting the timings as timing data; and an input information specifying step for creating time-series data of the detection data based on the detection data and the timing data, comparing the time-series data with stored data in a database which has been set beforehand, specifying an input operation, and outputting the input operation as input information specifying data.

Effects of the Invention

According to the present invention, as the input area is formed on the human body and a trailing force for performing inputting is transmitted to the detection section of the device through the contacting body, the size of the detection section on the device can be reduced. Further, according to the present invention, detailed-oriented operation can be performed even if the size of the detection section on the device is reduced, because, in contrast to the conventional one in which a rod-shape section on a device is tilted and pointing is performed according to the tilt angle, the inputting method of the present invention is able to reflect the moving speed and moving amount of a pointer on the operating speed and operational moving amount. Further, according to the present invention, as it is possible to make an input area for inputting large although the detection section for detecting an input is small, an operation including scrolling which requires a large operating area and an operation in which a start position of an input is designated by an absolute position can be performed with high accuracy. Further, as an operator performs inputting through his/her body in the present invention, the operator is able to feel that inputting is performed by a contact with the body, so that the operator is able to confirm the position to which inputting is performed without looking at the inputting section. As such, inputting can be confirmed with high accuracy. Further, as the input device of the present invention does not involve botheration of winding a detection member on the body, and the detection section for detecting an input is only in a contact portion between the device and the body, the present invention has high portability.

BEST MODES FOR CARRYING OUT THE INVENTION

Next, embodiments of the present invention will be described in detail with reference to the drawings.

[First Embodiment]

FIG. 1(a) is a block diagram showing the configuration of an input device according to a first embodiment of the present invention. As shown in FIG. 1(a), the input device of the present embodiment includes an input section 3 disposed at a location contacting a fingertip performing an input and including a plurality of detection sections 2 which output a plurality of pieces of detection data "a" when detects a force; a timer management control section 6 which monitors the detection data "a" and is activated when detecting that an input is performed on the detection section 2 to thereby generate a trigger serving as a timing for detecting an input with certain time intervals and output the trigger as timing data "c"; and an input information specifying means 5 which, upon receiving the detection data "a" and the timing data "c", converts the detection data "a" into time-series data for each trigger based on the trigger of the timing data "c" and compares the time-series data with stored data "b" stored in a database 4 to thereby specify the input operation and output the input operation as input information specifying data "d".

FIG. 2 is a perspective view showing an example of the input section 3. In FIG. 2, a shaded area indicates an input area 1. In this example, the backside of the thumb, the backside of the index finger, and an area between them of the back of the left hand, are set to form the input area 1, and the tip of the thumb and the tip of the index finger touch the detection section 2. For example, when a finger of the right hand traces the input area 1, forces in a vertical direction and two horizontal directions, changing by time, are detected by the detection section 2. In FIG. 2, a reference numeral 8 indicates an information terminal, and a reference numeral 9 indicates an information presenting section thereof.

As shown in FIG. 3, the input area 1 shown in FIG. 2 is divided into a plurality of areas. An example of the division will be described. The input area 1 is divided into a first input area $1_1$ to a third input area $1_3$ distributed between the respective joints on the index finger, a fourth input area $1_4$ on the back of the hand, and a fifth input area $1_5$ to a seventh input area $1_7$ distributed between the respective joints of the thumb.

FIG. 4 is a cross-sectional view showing the specific structure of the detection section 2 used in the input device of the present embodiment. As shown in FIG. 4, the detection section 2 includes a key top $2_1$ where a fingertip of the operator contacts and presses; a parallel plate $2_2$ which is disposed below the key top $2_1$ and the plane shape thereof is rectangle, and pressure sensors $2_3$ disposed under the four corners of the parallel plate $2_2$. The four pressure sensors $2_3$ are used to detect forces of three-directional components according to distribution of the force applied to the four points. This means that forces in directions of three components such as a pressing force applied from a finger contact surface in a vertical direction, and two components in horizontal plane directions including a force of sliding in a fingertip direction and a force of sliding in a finger side face vertical direction.

It is noted that in the present specification, the pressing direction, the fingertip direction, and the finger side face vertical direction are used to have the following meanings. The pressing direction (z direction) is a direction vertical to the parallel plate $2_2$. The fingertip direction (x direction) is a direction parallel to the parallel plate $2_2$ and a direction pointed by the fingertip. The finger side face vertical direction (y direction) is a direction vertical to the pressing direction and the fingertip direction.

The pressure sensor $2_3$ is fixed on a wiring board 10 for outputting detection data of the three-direction components to the outside. In FIG. 4, a reference numeral 11 indicates a case, and a reference numeral 12 indicates a base.

The input information specifying data "d" output from the input device shown in FIG. 1(a) is displayed on a monitor, for example. FIG. 1(b) shows the configuration for displaying. In the input device shown in FIG. 1(b), the information presenting means 7 receives the input information specifying data "d" and presents, on the information presenting device, functions such as position and operation of a pointer assigned to that operation.

[Operation]

Next, operation of the present embodiment will be described with reference to FIGS. 1 to 5. First, when pressing is performed on the finger contacting the device with the fingertip, at step S101, the detection section 2 detects a pressing force in a vertical direction from the contact surface with the fingertip and a sliding force in the fingertip direction and a sliding force in the finger side face vertical direction, and outputs the respective three-directional components as press data, fingertip slide data, and finger side face vertical slide data, constituting the detection data "a". At step S102, when the timer management control unit 6 senses that input is performed on the detection section 2, the timer management control unit 6 generates timing for obtaining detection data 2 in the input information specifying unit 5 and recoding as data with certain time intervals, and outputs the data as the timing data "c". At step S103, the input information specifying unit 5 converts the detection data "a" of the three directional components into time-series data according to the timing data "c", and compares this data with stored data "b" which is time-series data stored in the database 4 beforehand, to thereby specify which of the input operations is performed and output it as the input information specifying data "d". If the input device has the information presenting unit 7 as shown in FIG. 1(b), at step S104, the information presenting unit 7 displays the functions such as position and operation of the pointer assigned to the specified input information specifying data "d", on the display screen.

Next, a reason that a pressed portion of the finger when the input area is traced can be specified according to the detection data "a" will be described with reference to the index finger of the left hand. It should be noted that description will be given with use of two directional components including the pressing force in the vertical direction and the sliding force in the fingertip direction, of the three directional components detected by the detection section 2.

FIG. 6 is a diagram showing the index finger on which the input area 1 is formed, divided by joints. As shown in FIG. 6, the input area 1 is divided into three areas including an area from the fingertip to the first joint, an area from the first joint to the second joint, and an area from the second joint to the third joint, and are respectively referred to as the first input area $1_1$, the second input area $1_2$, and the third input area $1_3$.

Further, as a finger has rigidity with the bones which are linked by joints to each other, a finger can be virtually considered as a beam, the both ends of which are supported by rotating supports with limitations in their rotating angles. Further, the lengths of the respective input areas $1_1$, $1_2$, and $1_3$ are set to be $1_1$, $1_2$, and $1_3$.

FIG. 7 is a schematic diagram showing balances of forces when the respective input areas $1_1$ to $1_3$ are pressed. Association between two directional components of the forces detected by the detection section 2 and the respective input areas $1_1$ to $1_3$ will be described with reference to FIG. 7.

Item i) of FIG. 7 shows a state where the first input area $1_1$ is pressed. When the first input area $1_1$ is pressed, the first joint cannot be bent any more at an angle linearly linking the first input area $1_1$ and the second input area $1_2$ due to the moment of the force. As such, from six conditional expressions established by the condition of constraint of a horizontal length, the condition of constraint of a vertical length, the condition of balance of a horizontal force, the condition of balance of a vertical force, the condition of balance of a moment around the base of the finger, and the condition of balance of a moment around the fingertip, a relational expression between the vertically pressing force and the horizontally sliding force which are force components of the pressing force, the force at the third joint which is the base of the finger, and the force applied to the detection section 2.

It is assumed that a horizontal length from the fingertip to the base of the finger is w, a height is h, an angle from a horizontal direction of the axis of the first input area $1_1$ at the fingertip is $\theta_1$, an angle from a vertical direction of the axis of the third input area $1_3$ at the base of the finger is $\theta_3$, and a pressing force, working vertically, is F. The pressing position is assumed to be the middle of the beam in the respective input areas $1_1$ to $1_3$. Further, it is also assumed that a horizontal force of the force applied to the fingertip is $F_{1x}$, a vertical force thereof is $F_{1z}$, a horizontal force of the force applied to the base of the finger is $F_{3x}$, and a vertical force thereof is $F_{3z}$.

Condition of constraint of a horizontal length:

$$w = 1_3 \sin\theta_3 + (1_1 + 1_2)\cos\theta_1$$

Condition of constraint of a vertical length:

$$h = 1_3 \cos\theta_3 + (1_1 + 1_2)\sin\theta_1$$

Condition of balance of a horizontal force:

$$F_{1z} + F_{3z} = F$$

Condition of balance of a vertical force:

$$F_{3x} = F_{1x}$$

Condition of balance of a moment around the base of the finger:

$$\frac{1}{2} l_1 F \cos\theta_1 = w F_{3z} + h F_{3x} \quad \text{[Expression 1]}$$

Condition of balance of a moment around the fingertip:

$$\left[ l_3 \sin\theta_3 + \left(\frac{1}{2} l_1 + l_2\right) \cos\theta_1 \right] F = w F_{1z} - h F_{1x} \quad \text{[Expression 2]}$$

By substituting appropriate values into $1_1$, $1_2$, $1_3$, $\theta_1$, and $\theta_3$ of these balance expression horizontal force $F_{1x}$ and the vertical force $F_{1z}$ applied to the fingertip can be calculated.

Similarly, when the second input area $1_2$ is pressed, the horizontal force $F_{1x}$ and the vertical force $F_{1z}$ can be calculated from the balance expressions shown in ii) of FIG. 7. In the example shown, although the finger is bent at the second joint but not at the first joint, if the second input area $1_2$ is pressed, there is a case where the second joint is held at an angle of linearly linking the second input area $1_2$ and the third input area $1_3$, similar to the case of pressing the third input area $1_3$, depending on the force applying position and angle.

When the third input area $1_3$ is pressed, the second joint is not bent any more at an angle of linearly linking the second input area $1_2$ and the third input area $1_3$ by the moment of the force, as shown in item iii) of FIG. 7 showing a state where the third input area $1_3$ is pressed. As such, the balance expression in item iii) of FIG. 7 is established, and calculation can be performed as in the cases where the first input area $1_1$ and the second input area $1_2$ are pressed.

Further, when attempting not to bend joints by laying stress on the finger, as it is possible to assume that the entire finger is a rigid body, the force can be calculated by the balance of force in the same manner.

As described above, by substituting appropriate values into $1_1$, $1_2$, $1_3$, F, $\theta_1$, and $\theta_3$, the horizontal force $F_{1x}$ and the vertical force $F_{1z}$ in each of the cases can be calculated. Now, assuming that $F_{1x}$ and $F_{1z}$, when the first, second, and third input areas are pressed, are respectively represented as $F_{1x}(1)$, $F_{1z}(1)$; $F_{1x}(2)$, $F_{1z}(2)$; $F_{1x}(3)$, $F_{1z}(3)$, the following expressions are established as shown in FIG. 7:

$$F_{1x}(1) < F_{1x}(2) < F_{1x}(3)$$

$$F_{1z}(1) > F_{1z}(2) > F_{1z}(3)$$

Accordingly, the following expression is established:

$$F_{1x}(1)/F_{1z}(1) < F_{1x}(2)/F_{1z}(2) < F_{1x}(3)/F_{1z}(3)$$

As such, it is understood that the pressed input area can be specified from the ratio between press data ($F_{1z}$) and slide data ($F_{1x}$) of the detection data "a". Accordingly, by examining the time course of $F_{1x}/F_{1z}$, it can be determined whether tracing is performed from the base of the finger to the fingertip or from the fingertip to the base of the finger. As such, tracing operation can be specified.

Next, description will be given for the grounds that a tracing operation can be specified based on the detection data "a" when the tracing operation is performed in the respective input areas $1_1$, $1_2$, and $1_3$ of the finger shown in FIG. 6 in a direction from left to right viewed from the operator. FIG. 8 is a diagram schematically showing the index finger of a left hand, which is the same part as that shown in FIG. 6. In FIG. 8, each of the input areas is further divided into two areas. For example, the first input area $1_1$ is divided into two areas of a first input area radial side $1_{11}$ on the right side (viewed from the operator) from the center line of the finger, and a second input area ulnar side $1_{12}$ on the left side thereof, and the second input area $1_2$ is divided into two areas of a first input area radial side $1_{21}$ on the right side (viewed from the operator) from the center line of the finger, and a second input area ulnar side $1_{22}$ on the left side thereof. The third input area $1_3$ is divided into two areas of a first input area radial side $1_{31}$ on the right side (viewed from the operator) from the center line of the finger, and a second input area ulnar side $1_{32}$ on the left side thereof. For example, when the first input area radial side $1_{21}$ is pressed, a force is generated on the vertically left side (ulnar side) of the finger side face, and when the second input area ulnar side $1_{22}$ is pressed, a force is generated on the vertically right side (radial side) of the finger side face. As such, by verifying the output detection data "a", it can be determined whether the second input area $1_2$ is traced from the radial side to the ulnar side or from the ulnar side to the radial side. This also applies to the first input area $1_1$ and the third input area $1_3$.

Next, description will be given for an exemplary method for specifying an input operation at step S103 by comparing time-series data obtained from the detection data "a" and the timing data "c" with the stored data "b" in the database 4.

FIG. 9 shows time-series data of pressing directions and sliding directions (two directions) according to input operations stored in the database 4. As shown in FIG. 9, time-series data as a template is stored in the database 4 as stored data "b" associated with an input operation.

The left column of FIG. 9 shows the index finger of a left hand and a direction of a tracing operation (sliding operation) performed as an input operation on this finger, by an arrow. The right column of FIG. 9 shows forces in three directions which vary according to the tracing operation.

FIG. 9$i$) shows the case of tracing the second input area $1_2$ in a left direction (viewed from a person performing inputting), that is, tracing from the second input area radial side $1_{21}$ to the second input area ulnar side $1_{22}$, and FIG. 9$ii$) shows the case of tracing the second input area $1_2$ in a right direction, that is, tracing from the second input area ulnar side $1_{22}$ to the second input area radial side $1_{21}$. FIG. 9$iii$) shows the case of tracing the index finger of the left hand from the base of the finger to the fingertip, that is, tracing from the third input area $1_3$ to the first input area $1_1$, and FIG. 9$iv$) shows the case of tracing the index finger of the left hand from the fingertip to the base of the finger, that is, tracing from the first input area $1_1$ to the third input area $1_3$. Corresponding to the respective tracing operations, the right column of FIG. 9 shows a particular time-series pattern, with which the respective tracing operations can be specified. Accordingly, if the pattern of time-series data is specified, corresponding input operation can be specified.

The input information specifying unit 5 compares time-series data generated from the detection data "a" with stored data "b" which is time-series data of the stored data "b" with use of a DP matching algorithm which is one of pattern recognitions, to thereby specify the input operation.

FIG. 10 is a flowchart showing the outline of the process using DP matching. First, at step S201, a distance between elements of the time-series data of the detection data "a" obtained for each timing data "c" and the stored data "b" is calculated. Then, at step S202, a path minimum cost is calculated using the calculated distance between the elements. At last, at step S203, a piece of time-series data in the stored data "b" is specified as an input pattern of the detection data "a" in time series by using the calculated path minimum cost, and an input operation corresponding to the time-series data is output as input information specifying data "d".

Next, each of the steps shown in FIG. 10 will be described in more detail. First, as the detection data "a" obtained for each timing data "c", used in the present invention, is time-series data of a vertically pressing force, a sliding force in a fingertip direction, and a sliding force in a finger side face vertical direction from the start of the pressing until the end of the pressing (from the start to the end of tracing), $$P=(p_1,p_2,\ldots p_i,\ldots p_I),$$

where i is time series (i=1, . . . I). Data of each time series, including the sliding force in a fingertip direction, the sliding force in a finger side face vertical direction, and the vertically pressing force, is represented as $$pi=(p_{ix},p_{iy},p_{iz})$$

Further, as a reference pattern is also time-series data of the three components, the following expression is established.

$$R=(r_1^k,r_2^k,\ldots,r_j^k,\ldots,r_J^K) \quad \text{[Expression 3]}$$

where j is time series (j=1, . . . J), and k is an index representing each reference pattern. Data of each time series, including the sliding force in the fingertip direction, the sliding force in the finger side face vertical direction, and the vertically pressing force, similar to the detection data "a", is represented as $$r_j=(r_{jx},r_{jy},r_{jz})$$

As shown in FIG. 11 illustrating a DP matching path diagram, a DP matching is shown on a lattice, and a cost is on the path. In the DP matching, a path where the sum becomes minimum and the total cost are calculated so as to find a reference pattern which is the closest to the input pattern.

First, at step S201, a distance between elements of the time-series data of the detection data "a" and the stored data "b" is calculated.

The cost at a lattice of (I, j) is represented as follows.

$$d(i,j)=\|p_i-r_j^k\|=\sqrt{(p_{ix}-r_{jx}^k)^2+(p_{iy}-r_{jy}^k)^2+(p_{iz}-r_{jz}^k)^2} \quad \text{[Expression 4]}$$

This is calculated for all lattice points.

Next, at step S202, the path minimum cost is calculated. FIG. 12 illustrates a minimum accumulation cost on a lattice point. With use of FIG. 12, a computation expression of a lattice point at (I, j) is represented as follows.

$$g(i,j)=\min\begin{Bmatrix} g(i-1,j+d(i,j)) \\ g(i-1,j-1)+2d(i,j) \\ g(i,j-1)+d(i,j) \end{Bmatrix} \quad \text{[Expression 5]}$$

This includes symmetry-type path limitation. This is repeatedly calculated from smaller values of time series I, j.

Next, in the distance calculation between patterns at step S203, at (I,J), the following calculation is performed to obtain a distance between the input pattern (time-series data of detection data "a") and the reference pattern (time-series data of stored data "b").

$$D(P,R)=\frac{g(I,J)}{I+J} \quad \text{[Expression 6]}$$

This is applied to all patterns which have been stored, and an input operation associated with the reference pattern corresponding to the smallest distance between patterns is specified as an input operation of the detection data "a", and is output as input information specifying data "d".

Although DP matching is used in the present embodiment, other methods for performing matching including time series or those specifying operation may be used.

Further, when specifying an input operation, an input operation to be allocated may be changed depending on how it changes. For example, if a change per unit time in the input area 1 is large, it may be determined that a pointing operation or a scrolling operation is performed at a high speed, so that the operation is output as input information specifying data "d".

Further, in the present embodiment, although the timer management control unit 6 generates timing for recording detection data only when an input operation to the input section 3 is performed, it is acceptable to generate a constant timing in the timer management control unit 6, instead of that method.

Further, in the present embodiment, although description has been given for an index finger of a left hand, it is possible to detect an input operation to an area other than the first input area $1_1$, the second input area $1_2$, or the third input area $1_3$ of the index finger of the left hand, based on the detection data "a" similarly.

Further, the detection section 2 is not limited to the index finger of the left hand. It is acceptable to apply to a thumb or to other fingers at the same time so as to increase the amount of information to be obtained.

Further, although the input area 1 is the back of a left hand or the back of a finger in the present embodiment, the input area is not limited to a hand or a finger. The input area may be applied to other parts of the body. For example, it is acceptable that a person stands on a device and performs an input operation on a knee or a thigh, and the detection section 2 obtains a change in the force at the sole and associates the detection data and the input operation.

Further, in the present embodiment, although description has been given exemplary for representative operations such as tracing in a right direction, tracing in a left direction, tracing in a fingertip direction, and tracing in a finger base direction, tracing operations are not limited to these examples. For example, tracing may be in an oblique direction or may be performed on a plurality of fingers. The tracing may include a pointing or scrolling operation or an operation called tapping in which pressed position does not change.

Further, the detection data "a" and the stored data "b" in the database 4 may be handled as ratio of a sliding force in a fingertip direction to a sliding force in a finger side face vertical direction with respect to a force in a pressing direction, or the data values of the three directional components may be directly used.

Further, in the case of performing one directional operation such as scrolling, two directional components of a pressing direction and a fingertip sliding direction may be used, and an operation such as scrolling may be performed by using a ratio of the force in the fingertip sliding direction to the force of the pressing direction.

Further, in the present embodiment, although the information presenting means 7 receives the input information specifying data "d" and presents functions such as a scrolling operation or a pointing operation on the display screen, the present invention is not limited to this configuration. The information presenting means 7 may receive input information specifying data "d" and present text, symbols, data, or the like on the display screen.

Further, in the present embodiment, although four pressure sensors are combined in order to detect three directional forces in the detection unit 2, other means may be used if three directional forces can be detected. For example, a plurality of strain sensors may be disposed under the key top so as to detect tilt of the contact surface to thereby detect forces of three directional components, or a pressure sensor in a plane shape may be disposed under the key top so as to detect pressure distribution under the key top to thereby obtain forces of three directional components based on the bias of the distribution.

Further, in FIG. 2, although a thumb and an index finger are used and a terminal is used while being placed on, the terminal may be used while being held as shown in FIG. 13 illustrating the present invention being applied to a thin, card-type terminal.

The input device of the present invention is also suitable for a large operation requiring a stroke such as handwriting input, because the detection section 2 is a small area of a fingertip and although the area exposed on the surface of the terminal is small, the input area 1 for operating the device is across the finger.

Further, when performing an operating such as a pointing operation of a mouse, as it is possible to directly designating an absolute position of the information presenting section 9 which is different from an input device in which only a relative positional change such as a track point is operated, quick input can be performed.

Further, in the case of performing an operation for changing the position or speed of a pointer of a mouse, as an operation control to the input area 1 corresponds to the amount of movement of a finger or a speed of moving a finger, it is instinctive and easy to operate.

Further, as the detection section is provided between the device and a finger holding the device, there is no need to attach a sensor for detecting an input to the body side. As such, motion other than operation will not be interrupted, so that the device is easy to use.

[Second Embodiment]

FIG. 14 is a block diagram showing the configuration of an input device according to a second embodiment of the present invention. As shown in FIG. 14, the input device of the present embodiment includes, an input section 3 having a plurality of detection sections 2 for detecting a state of pressure distribution generated on a contact surface with a fingertip when being pressed, and outputting detection data "e" which is pressure distribution data output from the detection section 2; a timer management control section 6 which monitors the detection data "e" and is activated when detecting that an input is performed on the detection section 2 to thereby generate a trigger serving as a timing for detecting inputs with certain time intervals and output the trigger as timing data "c"; and an input information specifying means 5 which, upon receiving the detection data "e" and the timing data "c", compares data converted from the detection data "e" (normalization center of gravity position in the pressed area in the detection section 2) with preset stored data "f" stored in a database 4 to thereby specify the pressed position and operation, and outputs the position and the operation as input information specifying data "d".

Similar to the first embodiment, as the input device of the present embodiment corresponds to a thin, card-size terminal shown in FIG. 13, an input area 1 on the thumb of a left hand is pressed by a right hand in a state where the terminal is held by the left hand, and pressure distribution on the detection section 2 pressed by the fingertip of the thumb of the left hand is measured. In this embodiment, it is assumed that a third input area 13 is a knuckle between the base of the thumb to the first joint, a second input area 12 is the first joint, and a first input area 11 is a fingernail.

FIG. 15 is a plan view showing a state of the detection section 2 disposed on an information terminal 8. As shown in FIG. 15, the detection section 2 is configured such that pressure sensors 23 are arranged in a matrix on a portion contacting a finger surface so as to detect pressure-sensitive distribution applied from the finger surface at a number of points.

Next, operation of the input device of the present embodiment will be described. In the present embodiment, the input information specifying unit 5 uses the detection data "e" indicating load distribution from the finger surface to calculate the load center of gravity, and specifies pressing position and operation from changes in the position.

FIG. 16 is a flowchart showing the operation of the input information specifying unit 5. First, at step S301, data of pressure surface distribution which is a measured value of the pressure sensors 23 arranged in a matrix on the surface contacting the fingertip is received as detection data FIG. 17 illustrates a state of pressure-sensitive distribution of the detection section 2. The detection section 2 detects a state at a position contacting the finger as pressure-sensitive distribution. The pressure sensors 23 which acquire pressure surface distribution of the detection section 2 are arranged in a matrix of (1, 2, . . . i, . . . I) in an x direction and (1, 2, . . . j, . . . J) in a y direction. In this embodiment, a measurement value of the detection section 2 at a coordinate (i,j) is assumed to be $F_{ij}$.

Next, at step S302, an area of the detection section 2, where the fingertip contacts, is separated. As the detection section 2 and the finger contact each other in an oval plane, a rectangle area containing the oval shape is extracted, and the coordinate of the vertex is set to be $P_1, P_2, P_3, P^4$. In the rectangle area, as the long axis direction of the rectangle area is a fingertip direction and the short axis direction thereof is a finger side surface vertical direction, the fingertip direction can be extracted by calculating the long axis direction of the rectangle area.

Next, at step S303, a load center of gravity position $P_G$ is calculated. An x-direction component $P_{Gx}$ and a y-direction component $P_{Gy}$ of $P_G$ are calculated by the following expressions.

$$P_{Gx} = \frac{\sum_{i=1}^{I}\left[i \times \sum_{j=1}^{J} Fij\right]}{I \times \sum_{i=1}^{I}\sum_{j=1}^{J} Fij}$$ [Expression 7]

$$P_{Gy} = \frac{\sum_{i=1}^{I}\left[i \times \sum_{j=1}^{J} Fij\right]}{I \times \sum_{i=1}^{I}\sum_{j=1}^{J} Fij}$$ [Expression 8]

Next, at step S304, a total load F is calculated. The total load F is calculated by the following expression.

$$F = \sum_{i=1}^{I}\sum_{j=1}^{J} Fij$$ [Expression 9]

Next, at step S305, it is checked whether or not the total load exceeds a certain value, and if it does not exceed, the process returns to step S301, while if it exceeds, the process moves to step S306. As the load center of gravity position $P_G$ is unstable in a low-load stage, step S305 is set so as to use only stable data. At step S306, a center of gravity directional vector to a position serving as the load center of gravity in the rectangle area is calculated. The rectangle center of gravity directional vector is represented as $V_G \rightarrow$. The start point of the rectangle center of gravity directional vector is set to be a vertex on the side close to the base of the finger in the rectangle area, which is $P_1$ near the radius in this embodiment.

Next, at step S307, a long axis directional vector and a short axis directional vector are calculated, which are obtained from adjacent two sides in the rectangle area. The start point of the long axis directional vector and the short axis directional vector is P1 which is the same as that of the rectangle center of gravity directional vector at step S306, and the rectangle long axis directional vector is represented as $V_L \rightarrow$, and the rectangle short axis directional vector is represented as $V_S \rightarrow$.

Next, at step S308, a center of gravity position ratio $R_L$ (a normalized, absolute value of the long axis directional component of the center of gravity directional vector $V_G \rightarrow$) which is a ratio between the long axis directional component of the center of gravity directional vector and the long axis directional vector, and a center of gravity position ratio $R_S$ (a normalized, absolute value of the short axis directional component of the center of gravity directional vector $V_G \rightarrow$) between the short axis directional component of the center of gravity directional vector and the short axis directional vector are calculated.

The center of gravity position ratio $R_L$ in the long axis direction is calculated from the cosine of an angle defined by the rectangle long axis directional vector and the rectangle center of gravity directional vector, and the value is normalized such that the value takes 0 if the center of gravity is at the base of the finger, while the value takes 1 if the center of gravity is at the leading edge of the fingertip. Further, the center of gravity position ratio $R_S$ in the short axis direction is calculated from the cosine of an angle defined by the rectangle short axis directional vector and the rectangle center of gravity directional vector, and the value is normalized such that the value takes 0 if the center of gravity is on the radial side of the finger, while the value takes 1 if the center of gravity is on the ulnar side of the finger. As such, the following expressions are established.

$$R_L = \frac{\vec{V}_L \times \vec{V}_G}{|\vec{V}_L|^2}$$ [Expression 10]

$$R_S = \frac{\vec{V}_S \times \vec{V}_G}{|\vec{V}_S|^2}$$ [Expression 11]

($R_L$, $R_S$) obtained from the calculated $R_L$ and $R_S$ shows the normalized center of gravity coordinate in the rectangle area.

Next, at step S309, it is monitored whether or not timing data "c" is generated within a predetermined time period. If timing data "c" is generated, the process returns to step S301, and the load center of gravity position, which moves according to the tracing operation, is measured. If timing data "c" is not generated within the predetermined time period, the process moves to step S310, and input information is specified with reference to stored data "f" from the database 4, and the information is output as input information specifying data "d". This step S310 is able to be performed by means of DP matching described with reference to FIGS. 10 to 12. However, in the present embodiment, at step S201 in FIG. 10, distances between elements of the time-series data of the center of gravity position ratios $R_L$ and $R_S$ calculated from the detection data "e" and the stored data "f" are calculated.

In the present embodiment, if a tracing operation in a left direction as shown in FIG. 9i), for example, is performed on the thumb of a left hand, the center of gravity position ratio $R_S$ in a short axis direction varies from a value close to 0 to a value close to 1 ($R_L$ is almost constant). Further, if a tracing operation in a fingertip direction as shown in FIG. 9iii), for example, is performed, the center of gravity position ratio $R_L$ in a long axis direction varies from a value close to 0 to a value close to 1 ($R_S$ is almost constant at about 0.5). In the present embodiment, an input operation is specified as described above at step S310.

In the present embodiment, although the pressure sensors 23 arranged in a matrix is used to detect a pressure surface distribution state, the sensors may not be arranged in a matrix if they can obtain a pressure surface distribution state. Further, although the center of gravity position ratio is used as a value which is normalized using, as a starting point, $P_1$ on the side close to the based of the finger and on the radial side of the thumb of the left hand, the starting point of the vector may be selected from an angle of any rectangles of $P_2$, $P_3$, and $P_4$. Further, a normalized value may not be a normalized value such as an observed value, if the value shows a center of gravity position.

Further at step S305, although the process moves to the next step only when the total load F becomes a load not less than a certain reference in order to use only a stable value of the load center of gravity position $R_G$, it is not limited to using the total load F in order to use only a stable value of the load center of gravity position $R_G$. For example, it is possible to use only when the area of a contact surface becomes not smaller than a certain area. Further, although a sensor detecting a value in an analog manner is used as the pressure sensor 23, it is possible to use a sensor detecting only digital values of ON and OFF. In that case, a load center of gravity position corresponds to an area center of gravity position of the contact surface. Further, although a center of gravity ratio is used as a reference for identifying the input area 1, it is not necessary to limit to a load center of gravity position if it is possible to specify the load position from the finger. For example, a point showing the largest value of the pressure sensor $2_3$ may be used similarly to the load center of gravity position $P_G$. Further, in order to determine the positions of the points $P_1$, $P_2$, $P_3$, and $P_4$ of the respective angles of the rectangle area from pressure distribution, it is not necessary to perform calculation for each input. For example, it is acceptable that when the pressure sensor $2_3$ detects that a finger contacts a terminal before an input, the finger contact area may be extracted beforehand and one which has been calculated may be used from the rectangle area.

Further, although calculation of the long axis vector and the short axis vector of a rectangle area is performed from pressure distribution, it is possible to extract an area other than a rectangle area if the fingertip direction and the finger side face vertical direction can be distinguished. For example, similar calculation may be performed by using the long axis directional vector and the short axis directional vector of an oval area extracted from a pressure distribution state.

EXAMPLE 1

FIG. 18 is a perspective view showing a state of performing an input to a terminal of an example of the present invention. The present example shows a case where it is difficult to provide a detection section 2 for detecting an input on the same plane as a display section because of a large display screen. The present example describes the case of applying the present invention to a full-screen terminal (Examples 2 and 3 also show the cases of applying the present invention to a full-screen terminal). In the present example, the detection section 2 is provided to a side of the device, and a tracing operation to each finger is performed by holding the device in a wrapping manner from the backside. In FIG. 18, a tracing operation is indicated by arrows (also in FIGS. 19 and 20). Identification of such a tracing operation may be used as a page forwarding function of electronic books and the like. In that case, it is only necessary to provide the detection section 2 at a location where each finger contacts the terminal. For example, the detection section 2 may be provided on a side where the thumb contacts, or on the back surface where the index finger contacts. In addition to the detection section 2, dents may also be formed at positions other than the position of the detection section 2 such that the orientation of the respective fingers becomes stable.

If a tracing operation to each finger is performed to change the function, as the input area to be operated is on the backside of the device, it is difficult to confirm an input area by watching the inputting state in the normal input system on a full-screen terminal. However, in the present example, as the object which is contacted for operation is a part of the body, the contacting position can be recognized. As such, the present example is effective in coping with a situation where the position for operation cannot be checked visually.

EXAMPLE 2

FIG. 19 is a perspective view showing a state of performing an input to a terminal of an example of the present invention. In the present example, the detection section 2 can be provided on a display screen where a thumb contacts, or a side or a back surface of the device where another finger contacts. According to the present example, an operation similar to a scrolling operation performed on a web connecting terminal can be identified, depending on the way of holding the device.

EXAMPLE 3

FIG. 20 is a perspective view showing a state of performing an input to a terminal of an example 3 of the present invention. Referring to FIG. 20, an operation similar to a mouse or a key operation in a cross direction can be identified, using the back of a hand in which a wide area can be used depending on the way of holding the device. In that case, it is acceptable to detect a state of a force at a position contacting each finer on the backside of the terminal, in addition to obtaining the force of the fingertip of the thumb by the detection section 2.

In the examples 1 to 3, the detection section 2 for detecting an input may not be contacted by a fingertip. For example, it is acceptable to specify a scrolling operation by enabling a wide area of a finger to be detected by the detection section 2, and identifying a tracing operation to the surface on the backside of a finger by obtaining a pressure distribution state on the surface contacting an information terminal by the detection section 2.

While the present invention has been described with reference to the embodiments (and the examples), the present invention is not limited to the above embodiments (and examples). Various changes in form and details which can be understood by those skilled in the art may be made within the scope of the present invention.

This application is based on upon and claims the benefit of priority from Japanese patent applications No. 2008-051867, filed on Mar. 3, 2008, and No. 2008-166854, filed on Jun. 26, 2008, the disclosures of which are incorporated herein in their entirety by reference.

INDUSTRIAL APPLICABILITY

The present invention is able to contribute to solving inconvenience of an operator caused by reduction of an area of an input section on a device, in an input device of a mobile device focused on portability or a display unit.

BRIEF DESCRIPTION OF THE DRAWINGS

FIG. 7 shows the balance of forces when each input area is pressed;

FIG. 9 illustrates correspondence between time-series stored data and input operation;

FIG. 10 is a flowchart when performing DP matching by an input information specifying unit;

Figure 1A:
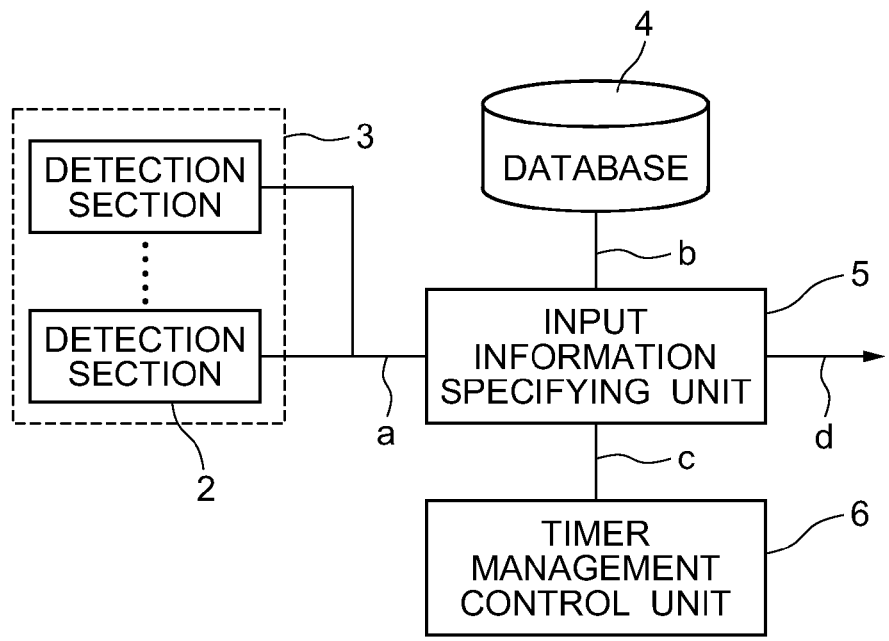
FIGS. 1(a) and 1(b) are block diagrams showing the configuration of an input device according to an embodiment of the present invention.
Figure 1B:
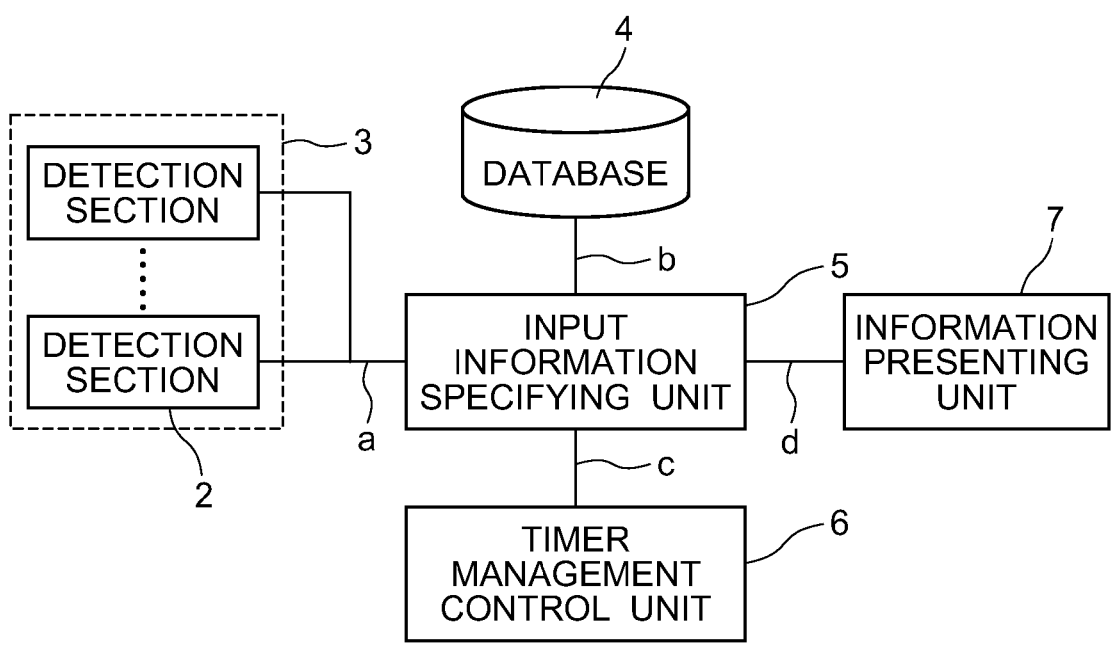
Figure 2:
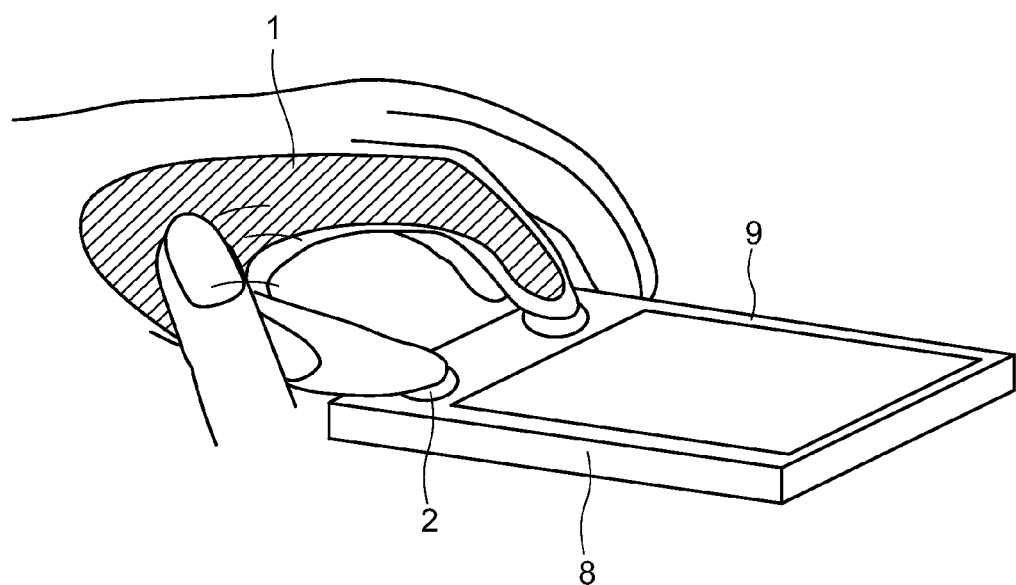
FIG. 2 is a perspective view showing the outer appearance of the input section 3 of FIG. 1.
Figure 3:
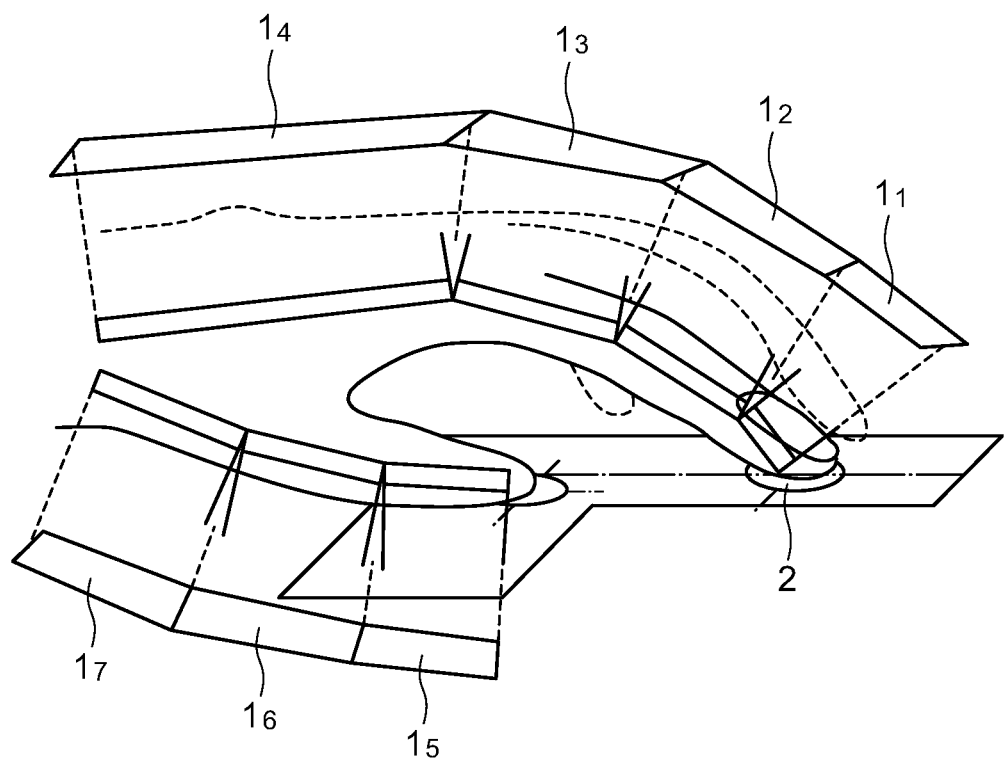
FIG. 3 is a schematic diagram showing the input area of FIG. 2 which is divided into a plurality of areas.
Figure 4:
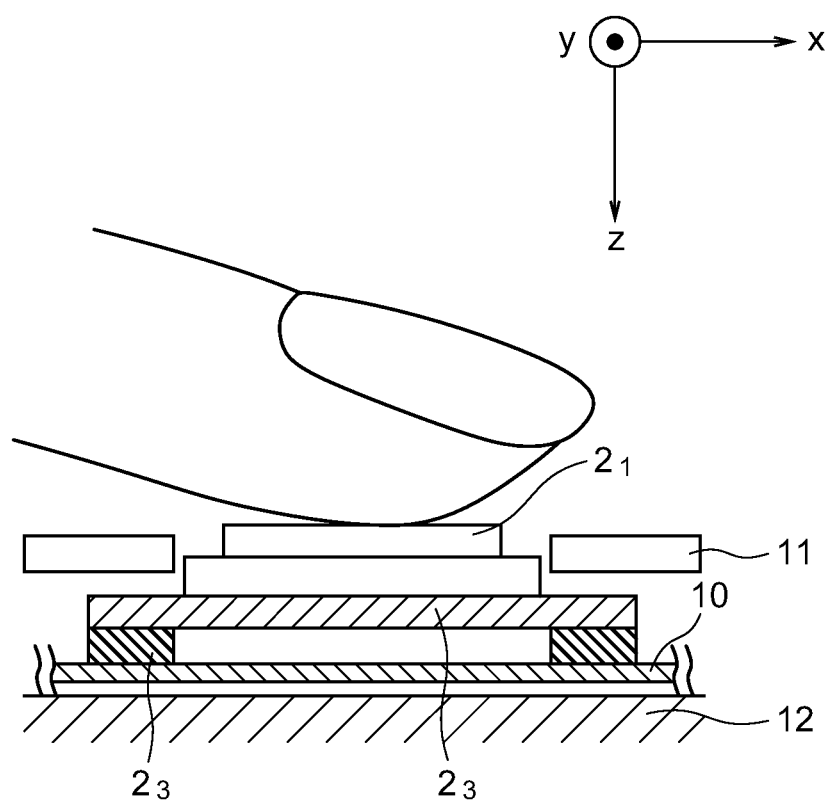
FIG. 4 is a cross-sectional view showing the structure of the detection section 2 of FIG. 1.
Figure 5:
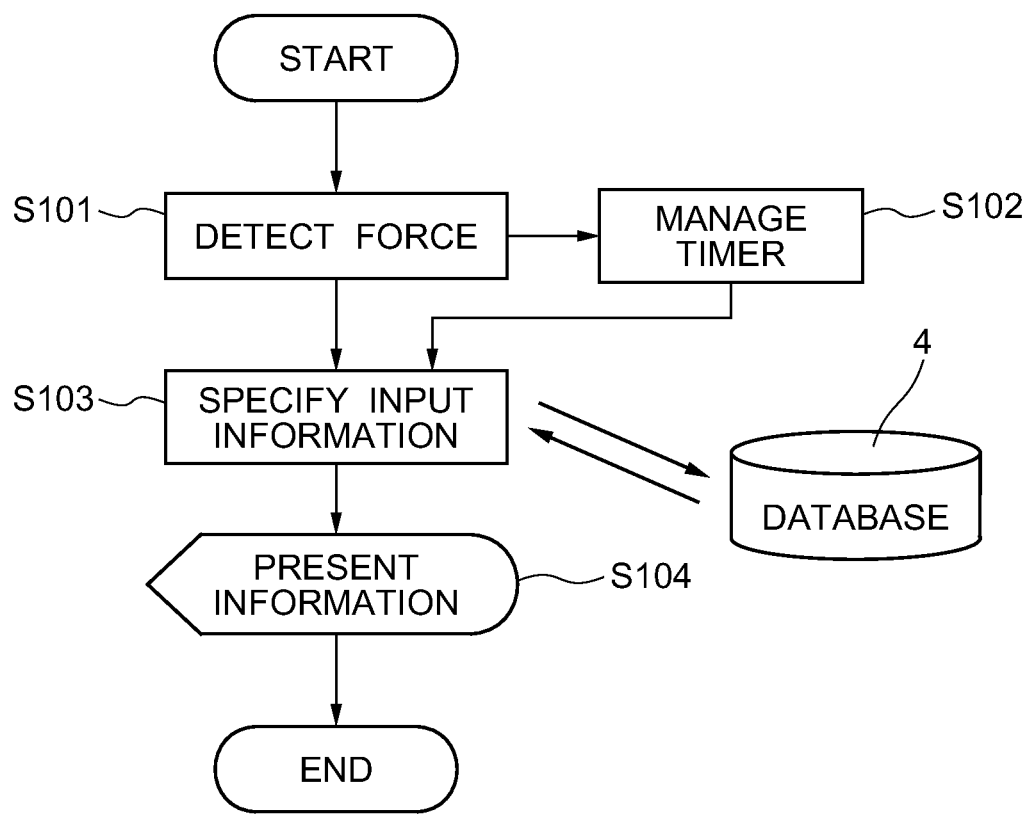
FIG. 5 is a flowchart showing the overall operation of the present invention.
Figure 6:
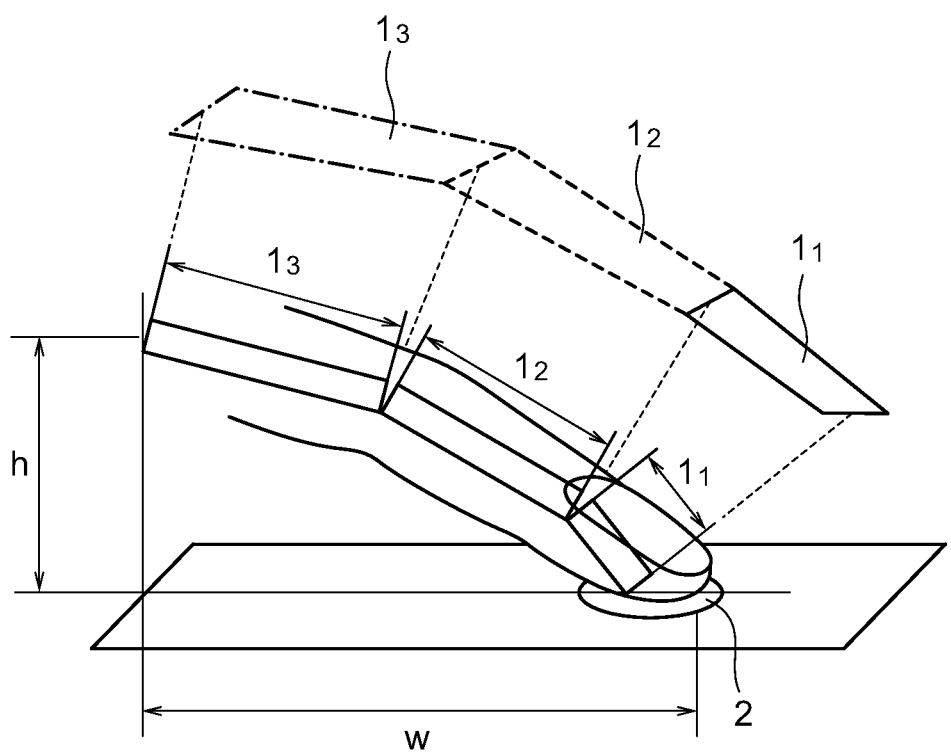
FIG. 6 is a schematic diagram showing an index finger which is an input area and is divided by the respective joints.
Figure 8:
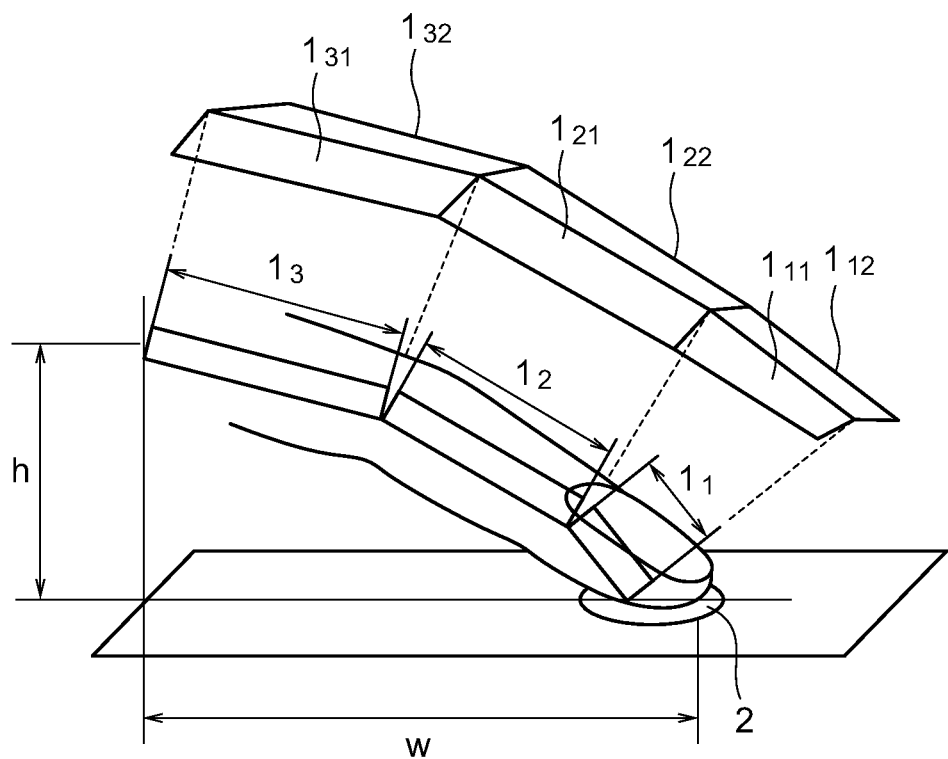
FIG. 8 is a diagram showing the first to third input areas which are divided into a plurality of areas.
Figure 11:
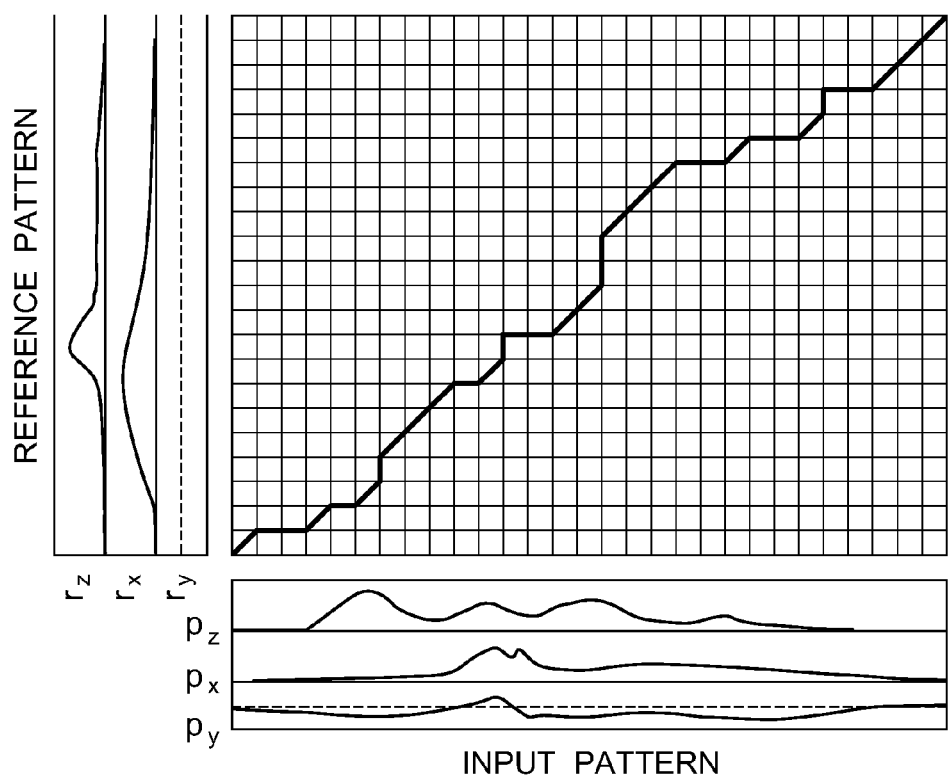
FIG. 11 is a chart showing a DP matching path diagram.
Figure 12:
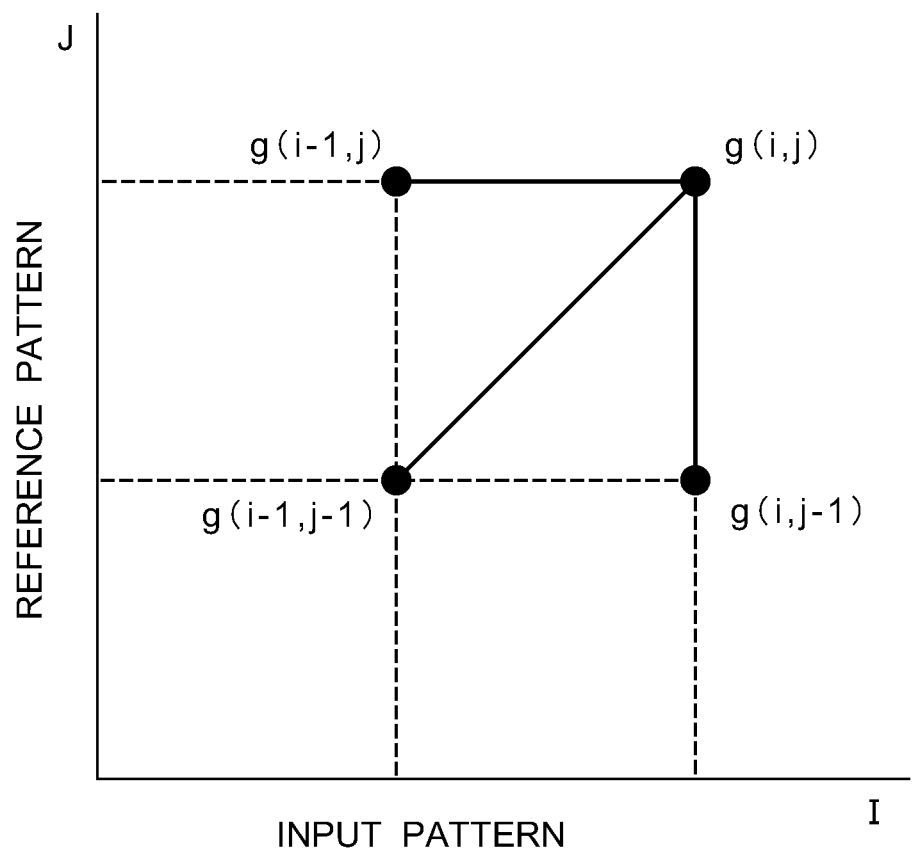
FIG. 12 is a chart illustrating a minimum accumulation cost on a lattice point.
Figure 13:
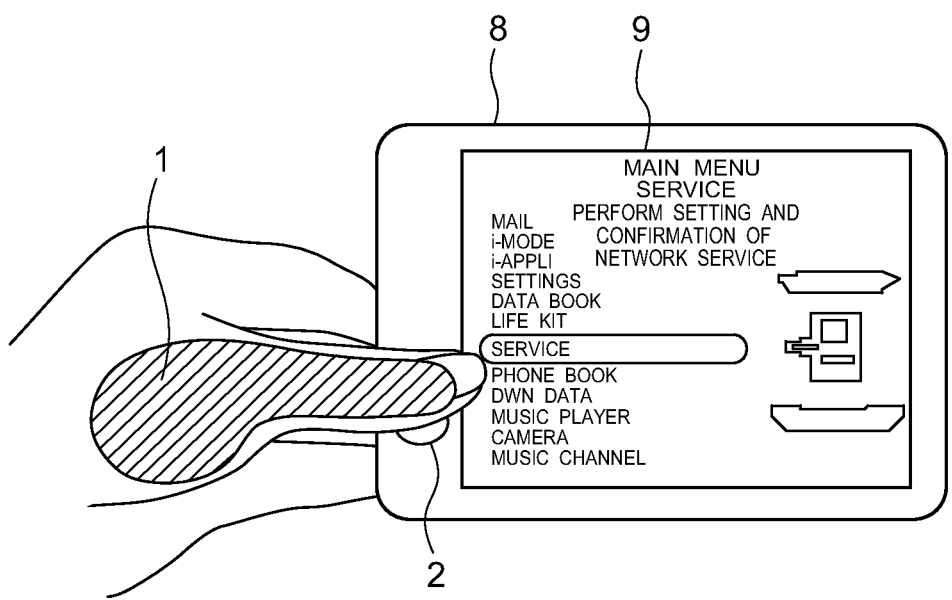
FIG. 13 is an illustration showing a state of performing inputting to a card-size, thin terminal to which the input device of the present invention is applied.
Figure 14:
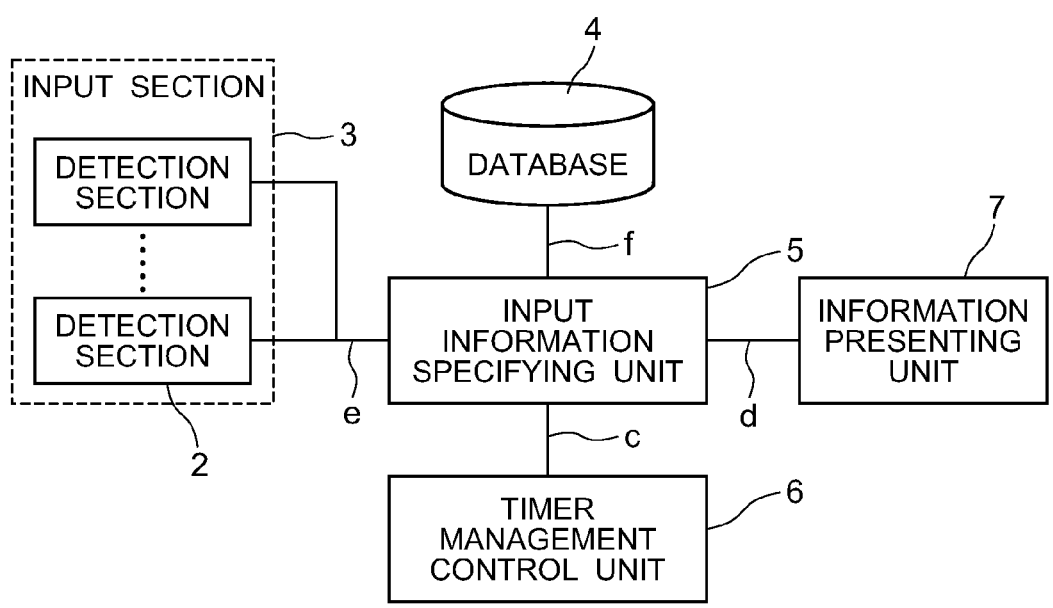
FIG. 14 is a block diagram showing the configuration of an input device according to a second embodiment of the present invention.
Figure 15:
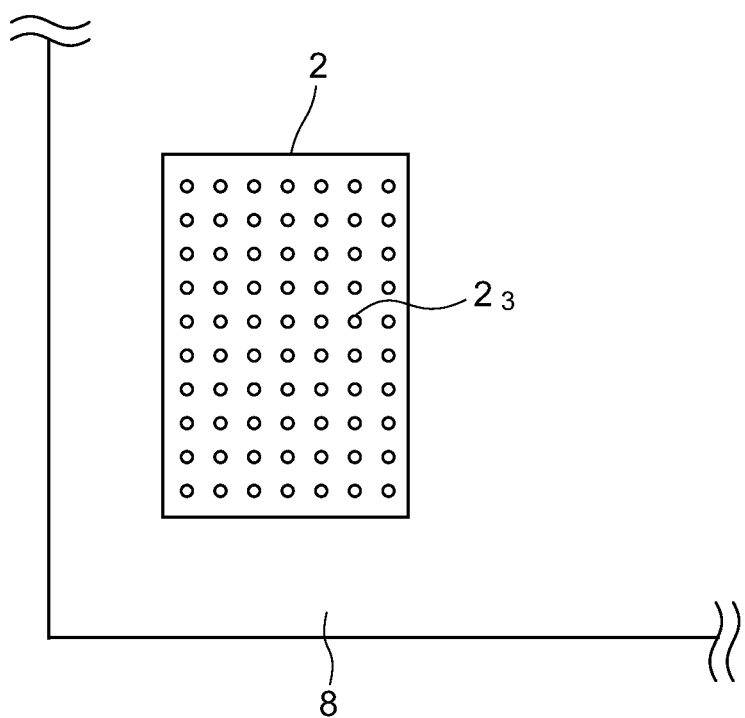
FIG. 15 is a plan view showing the structure of the detection section 2 of the second embodiment.
Figure 16:
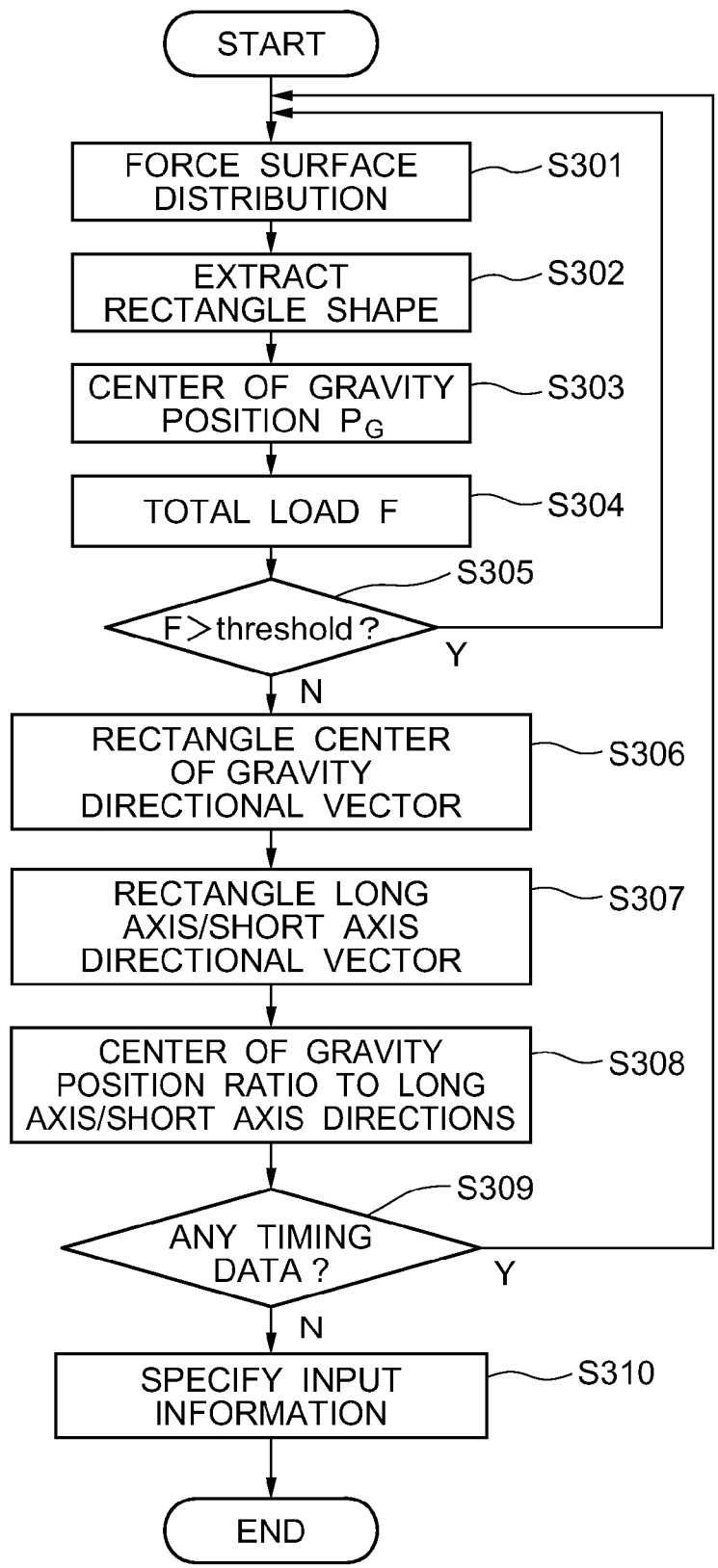
FIG. 16 is a flowchart showing the operation of the input information specifying unit 5 of the second embodiment.
Figure 17:
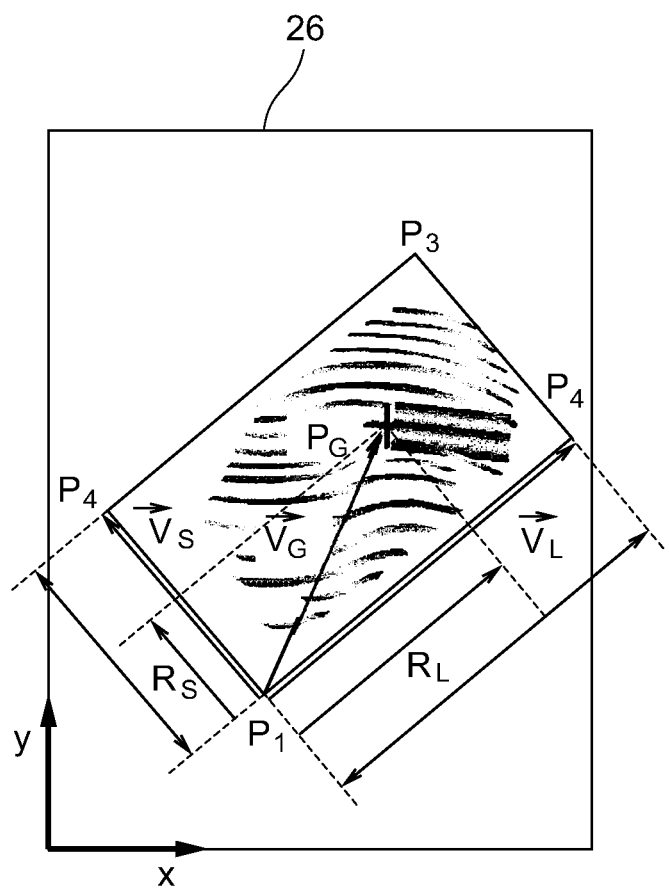
FIG. 17 is an illustration showing a pressure-sensitive distribution state of the detection section 2 of the second embodiment.
Figure 18:
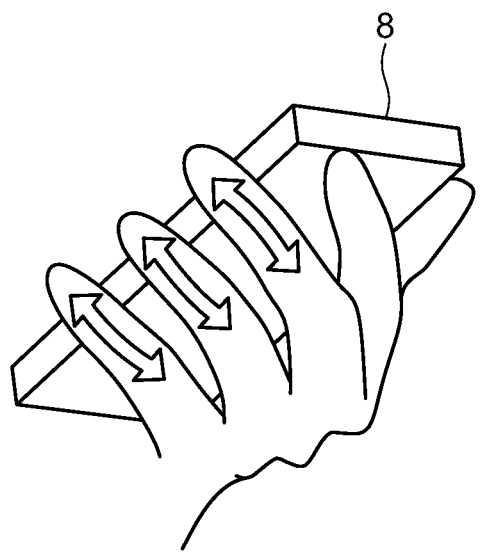
FIG. 18 is a perspective view showing an example 2 in which the present invention is applied to a full-screen terminal.
Figure 19:
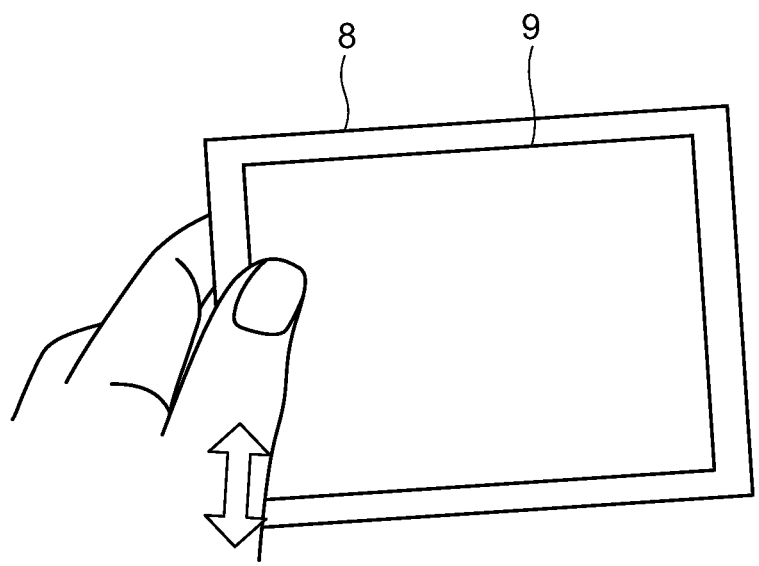
FIG. 19 is a perspective view showing the example 2 in which the present invention is applied to a full-screen terminal.
Figure 20:
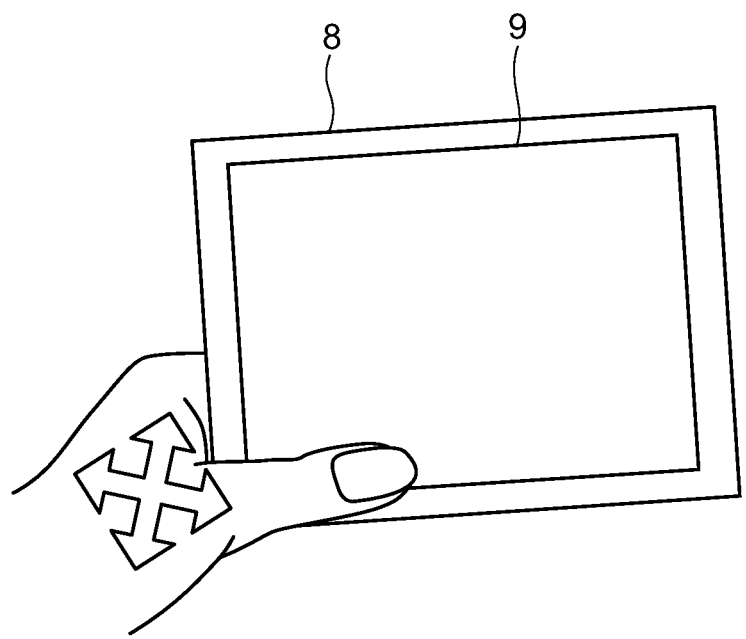
FIG. 20 is a perspective view showing an example 3 in which the present invention is applied to a full-screen terminal.

| REFERENCE NUMERALS | |
|---|---|
| 1 | input area |
| $1_1$ | first input area |
| $1_{11}$ | first input area radial side |
| $1_{12}$ | first input area ulnar side |
| $1_2$ | second input area |
| $1_{21}$ | second input area radial side |
| $1_{22}$ | second input area ulnar side |
| $1_3$ | third input area |
| $1_{31}$ | third input area radial side |
| $1_{32}$ | third input area ulnar side |
| $1_4$ | fourth input area |
| $1_5$ | fifth input area |
| $1_6$ | sixth input area |
| $1_7$ | seventh input area |
| 2 | detection section |
| $2_1$ | key top |
| $2_2$ | parallel plate |

-continued

| REFERENCE NUMERALS | |
|---|---|
| 2 | pressure sensor |
| 3 | input section |
| 4 | database |
| 5 | input information specifying unit |
| 6 | timer management control unit |
| 7 | information presenting unit |
| 8 | information terminal |
| 9 | information presenting section |
| 10 | wiring board |
| 11 | case |
| 12 | base |
| a, e | detection data |
| b, f | stored data |
| c | timing data |
| d | input information specifying data |

The invention claimed is:

1. An input device to be contacted and operated by a contact portion of a human body for operating a machine in connection therewith, the device comprising:

a detection section configured to be contacted by the contact portion of the human body, the detection section comprising a contact surface atop a plate element, and force detection sensors provided at locations beneath the plate that register forces applied to the contact surface in a first direction (X) along a plane of the contact surface, a second direction (Y) transverse to the first direction along a plane of the contact surface, and a third direction (Z) into the plane of the contact surface, such that a force applied to the contact surface is registered in three dimensions and output as detection data;

a timer management control unit that generates a timing for recording the detection data at a time interval, and outputs the timing as timing data; and an input information specifying unit that creates time-series data of the detection data based on the detection data and the timing data and compares the time-series data with stored data in a database, the stored data comprising a plurality of predetermined time-series data corresponding to forces applied to the contact surface by the contact portion in contact with the contact surface when trailing operations are performed by a first part of a human body operably sliding upon an area of a surface of another a second portion of the human body that is in the vicinity of connected to the contact portion in contact with the contact surface, such that when the time series data of the detection data resulting from a trailing operation, performed in the vicinity of the contact portion in contact with the contact surface upon the area of the surface of the second portion of the human body while the contact portion of the human body is in contact with the contact surface, corresponds to a predetermined time-series data stored in the database and associated with an input operation of the machine, the input information specifying unit outputs the input operation as input information specifying data for operating the machine.

2. The input device, according to claim 1, wherein the input information specifying data is sufficient to cause the machine to perform any of a presentation of a pointer position, an operation of a pointer, a scrolling operation, a text handwriting operation, or a page forwarding function.

3. The input device, according to claim 1, wherein the detection section is configured to be contacted by a fingertip of the human body, and the area of the surface of the another second portion of the human body is in the vicinity of next to a finger constituting the fingertip, and wherein the trailing operation generates a force upon the finger that is detected by the detection section via the fingertip in contact with the contact surface.

4. The input device, according to claim 1, wherein the detection section includes at least one of a pressure sensor capable of detecting press distribution of a plurality of points, or a plurality of pressure sensors arranged in a plane.

5. The input device, according to claim 1, wherein the timer management control unit regularly generates timings.

6. The input device, according to claim 1, wherein the timer management control unit regularly monitors the detection data, starts generation of a timing at the same time as occurrence of the detection data, and stops generation of the timing when the detection data ends.

7. The input device, according to claim 1, wherein the database stores, as the stored data, a time-series change in forces associated with output from the detection section of a pressing direction, a fingertip sliding direction, and a finger side face vertical sliding direction, or a time series change in a ratio of the force in the fingertip sliding direction to the force in the pressing direction and a ratio of the finger side face sliding direction to the force in the pressing direction, or a time-series change in a normalized center of gravity position of a load relative to the detection section, in association with an input operation.

8. The input device, according to claim 1, further comprising:
an information presenting unit which, upon receiving the input information specifying data, displays a predetermined symbol, data, or a function assigned to the input operation.

9. The input device, according to claim 1, wherein the contact portion of the human body is a finger.

10. A terminal including the input device according to claim 1.

11. An inputting method for operating a machine in connection therewith, comprising:
upon a contact portion of the human body contacting a detection section and a trailing operation being performed on an input area formed on a surface of the human body in the vicinity of connected to the contact portion, detecting a force transmitted via the contact portion of the human body and outputting the force as detection data, wherein the force transmitted via the contact portion corresponds to a position being trailed on the input area of the human body;
generating a timing for recording the detection data at a time interval, and outputting the timing as timing data;
creating, and storing in a computer memory, time-series data of the detection data based on the detection data and the timing data; and
comparing the time-series data with stored data in a database comprising a plurality of predetermined time-series data corresponding to forces applied to the contact surface by the contact portion in contact with the contact surface when trailing operations are performed upon the human body, such that when the time series data of the detection data resulting from the trailing operation corresponds to predetermined time-series data stored in the database associated with an input operation of the machine, the input operation is output as input information specifying data for operating the machine.

12. The method, according to claim 11, further comprising,
upon receiving the input information specifying data, displaying a predetermined symbol, data, or a function associated with the input operation.

13. The method, according to claim 11, wherein the contact portion of the human body is a finger, and the input area is an area between joints of the finger or above a bone ahead of a joint or an area including the surrounding thereof.

14. An input device to be operated by a portion of a human body for operating a machine in connection therewith, the device comprising:
detection means adapted to, in response to being in contact with a contact portion of the human body, detect a force transmitted to the detection means via the contact portion of the human body, and to output, when trailing is performed where an operable force is applied upon an input area on a surface of the human body that is in the vicinity of connected to the contact portion, detection data corresponding to the force detected by the detection means via said contact portion during said trailing, where the force transmitted via the contact portion and detected by the detection means corresponds to a position of the trailing on the input area on the surface of the human body;
timer management control means for generating a timing for recording the detection data at a time interval, and outputting the timing as timing data;
a database, having stored therein a plurality of predetermined time-series data corresponding to forces applied to the contact surface by the contact portion in contact with the contact surface when trailing is performed by an object operably pressing or sliding upon the surface of the human body that is in the vicinity of connected to the contact portion in contact with the contact surface; and
input information specifying means, that i) creates time-series data of the detection data based on the detection data and the timing data, ii) performs a comparison of the time-series data with the predetermined time-series data of the database, and, iii) based on the comparison, outputs an input operation as input information specifying data for operating the machine.

15. The input device, according to claim 14, wherein the detection means comprises at least one of a force sensor capable of detecting three directional components, a pressure sensor capable of detecting press distribution of a plurality of points, or a plurality of pressure sensors arranged in a plane.

16. The input device, according to claim 3, wherein the detection section includes at least one of a pressure sensor capable of detecting press distribution of a plurality of points, or a plurality of pressure sensors arranged in a plane.

17. The input device, according to claim 3, wherein the timer management control unit regularly generates timings.

18. The input device, according to claim 4, wherein the timer management control unit regularly generates timings.

19. The method, according to claim 11, wherein the predetermined time-series data stored in the database includes data corresponding to at least one of a time-series change in forces associated with a pressing direction on the input area, a fingertip sliding direction along the input area, a finger side face vertical sliding direction along the input area, a time series change in a ratio of an operable force of the fingertip sliding direction to an operable force in the pressing direction and a ratio of a finger side face sliding direction to the operable force in the pressing direction, and a time-series change in a normalized center of gravity position of a load relative to the detection section, in association with one or more input operations for operating the machine.

20. The input device, according to claim 14, wherein the predetermined time-series data stored in the database includes data corresponding to at least one of a time-series change in forces associated with a pressing direction on the input area, a fingertip sliding direction along the input area, a finger side face vertical sliding direction along the input area, a time series change in a ratio of an operable force of the fingertip sliding direction to an operable force in the pressing direction and a ratio of a finger side face sliding direction to the operable force in the pressing direction, and a time-series change in a normalized center of gravity position of a load relative to the detection section, in association with one or more input operations for operating the machine.

* * * * *